Oct. 9, 1956
S. NATELSON
2,765,955
UNIVERSAL AUTOMATIC TITRATOR
Filed Oct. 19 1953
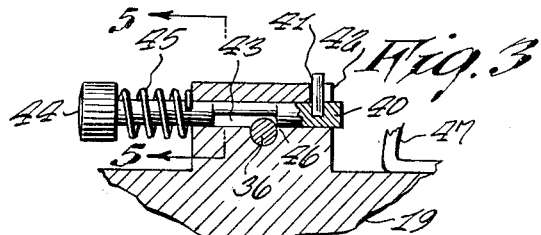
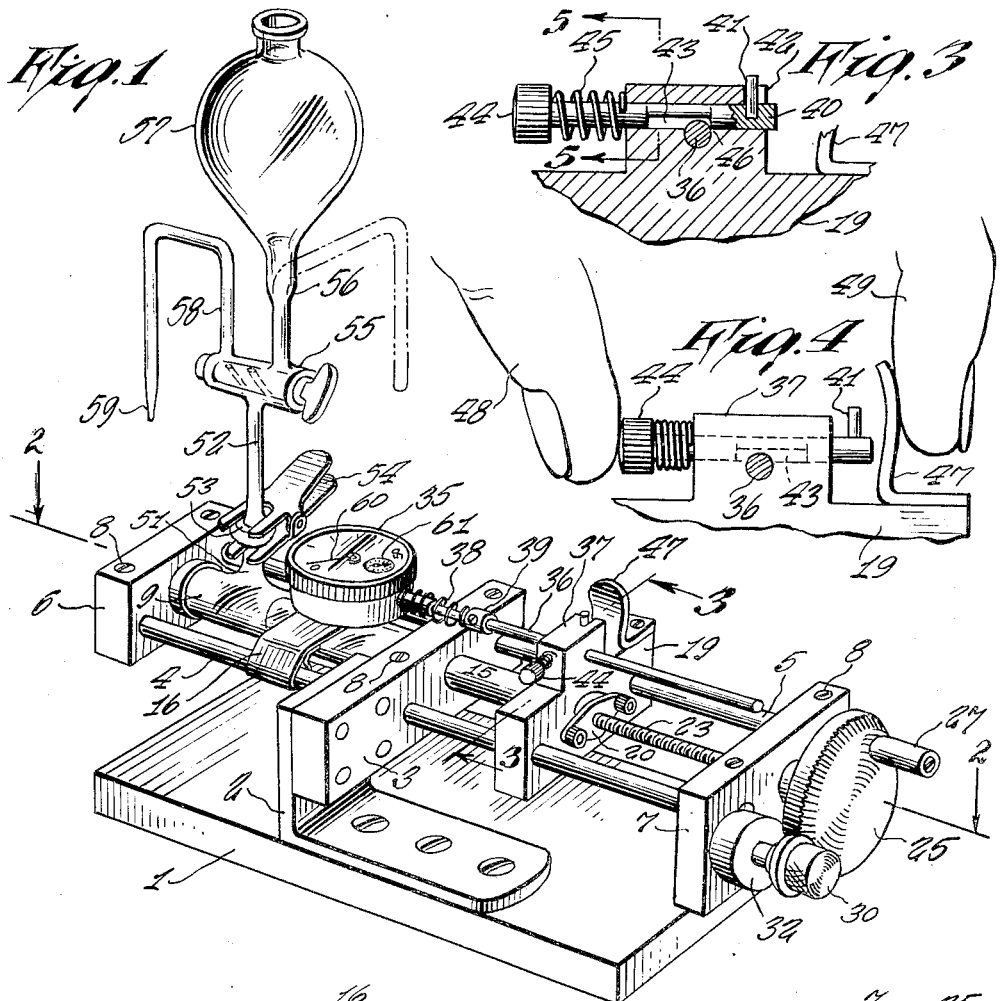
INVENTOR.
SAMUEL NATELSON
BY
ATTORNEY

United States Patent Office 2,765,955
Patented Oct. 9, 1956

2,765,955

UNIVERSAL AUTOMATIC TITRATOR

Samuel Natelson, Rockford, Ill.

Application October 19, 1953, Serial No. 386,865

10 Claims. (Cl. 222—32)

This invention relates to an instrument which can deliver measured amounts of liquid with great accuracy and precision for such uses as pipeting, filling ampules and titrating with ultra-micro and conventional quantities, more particularly to an automatically self zeroing instrument for the delivery of measured amounts of liquid. It is a universal automatic titrating apparatus as it is an ultra-micro, micro, semi-micro and macro buret and pipet all in one.

Usually in titrating and the like considerable time is spent in refilling the instrument and bringing the liquid to zero position. In view thereof, it is desirable that some mechanical means be provided so that these operations may be shortened. Where the volumes delivered vary widely in amount, such as for example 0.1 ml. to 10 ml. several different instruments are required. Thus instruments designed to deliver volumes of from 0.1 to 1 ml., 1 ml. to 2 ml. and 2 ml. to 10 ml. would comprise at least three different instruments if accuracy is to be achieved. Thus there is a need for a single instrument which could deliver all of these amounts with a high degree of accuracy.

Previously there had been proposed a device which consists essentially of a micrometer caliper the plunger of which was introduced into a reservoir containing mercury through a rubber gasket which was sealed in a stuffing box. The linear motion of the plunger was measured by a micrometer gauge that read directly in suitable units. A glass tube reservoir was connected to the first named reservoir and to a capillary tube having a gooseneck and a restricted orifice. In this device the operation was conducted and thereafter it became necessary to refill the reservoir after each analysis and to bring the instrument to zero position. While this device was of some assistance in the operation, it did not fulfill the requirements of automatic and rapid operation. The volume it could deliver was limited to a narrow range and if different volumes were to be delivered, several instruments were needed for the different ranges.

A second instrument which was used to deliver small amounts comprised a dial indicator, the plunger of which operated in a reservoir containing mercury through a rubber gasket which was sealed in a stuffing box. The linear motion of the plunger was measured by an indicating dial. The reservoir was connected to a tube having a gooseneck and a restricted orifice for delivering the liquid. Three different devices of this design were necessary to cover the range from 0.01 to 1 ml. This device had to be brought to zero after each titration and refilled frequently. Once the plunger, which is an integral part of the dial indicator, has traversed the length permitted by the dial indicator it must be returned to its original position by a laborious procedure of retreating with the plunger while the tip of the restricted orifice is dipping in the liquid to be delivered.

The present invention is intended and adapted to overcome the difficulties and disadvantages inherent in the prior devices of the type described, it being among the objects of the present invention to provide an instrument for automatically self zeroing and delivering measured quantities of liquid and capable of delivering a wide range of volumes in one instrument with a high degree of accuracy.

It is also among the objects of the preesnt invention to provide a device of the character described which is adapted for ultra-micro quantities of reagents, such as are used in the analysis of minute quantities of blood, and macro amounts, all in the same instrument.

It is further among the objects of the present invention to provide a device which, with but a single filling with reagent, is capable of use in conducting a large number of analyses.

It is still further among the objects of the present invention to provide apparatus which is sturdy, is of simple construction, has but few moving parts and is capable of long usage without deterioration.

In practicing the present invention there is provided a source of reagent of any suitable type with means of delivering the reagent to the instrument. The latter consists essentially of a cylinder for holding a relatively large quantity of reagent with a plunger suitably operated therein. An indicator or gauge is so connected to the plunger that it registers the amount of liquid delivered in any one operation of the plunger. After an analysis is completed a special mechanism is provided for instantaneously resetting the indicator to its zero position without the necessity of retracting the plunger. The instrument is now in a position for another delivery of reagent and analysis.

In the accompanying drawing constituting a part hereof and in which like reference characters indicate like parts and in which Fig. 1 is a perspective view of the instrument made in accordance with the present invention;

Fig. 2 is a horizontal cross sectional view thereof taken along line 2—2 of Fig. 1;

Fig. 3 is a fragmental cross sectional view taken along line 3—3 of Fig. 1;

Fig. 4 is an elevational view of the portion shown in Fig. 3 indicating a different position of the elements, and Fig. 5 is a transverse cross sectional view of the slider rod.

With reference to the drawing there is provided a base 1 having an upstanding bracket 2 mounted thereon. A block 3 is secured to bracket 2, the pair of horizontal parallel tie-rods 4 and 5 are mounted in block 3, one end of said tie-rods are secured in end block 6 and the other end of said tie-rods is mounted in the opposite end block 7. Set screws 8 extending in the blocks 3, 6 and 7 hold tie-rods 4 and 5 securely in position.

The horizontal cylinder 9 usually made of glass and open at one end, has the open end abutting against washer 10 located in recess 11 in block 3. The closed end 12 of cylinder 9 abuts against cup 13 against which a set screw 14 threaded through block 6 presses. A precision machined or ground plunger 15 fits loosely within cylinder 9, which is made of metal, glass, or Teflon, or other chemically resistant material capable of being accurately machined or ground. Washer 10 fits closely around portion 16' of plunger 15. Said plunger 15 passes through washer 10 and fits closely thereto. It may be of neoprene or Teflon or other chemically-resistant material. The extreme end 17 of plunger 15 is hollow and is wedged into member 18 which in turn is secured in the central opening in slide 19.

A threaded plate 20 is held onto the face of slide 19 by set screws 21. Plate 20 has a threaded opening 22 in which screw 23 operates. Said screw passes through bearing 24 in block 7 and has secured to the end thereof disk 25 by set screw 26. A handle 27 is provided on disk 25 whereby it may be rotated.

A disk has a beveled edge 28 which is knurled. It is adapted to contact with rubber ring 29, mounted in a rotatable and slideable knob 30. It has a collar 31 secured thereto with a pin 32 extending therethrough and into pin 33. Thereby knob 30 may be pushed to the left so that washer 29 contacts edge 28 and it may be rotated about pin 33. This provides a fine adjustment of the movement of plunger 15 toward the end of the titration.

With reference to Fig. 1 there is provided a dial-indicator or gauge 35 having the usual mechanism therein, rod 36 extending therefrom, said rod being attached to the mechanism. It is unnecessary to describe this mechanism as said indicator is a standard item on the market being used to measure distances in the machine shop. Rod 36 passes through an opening 37 in the upper part of slide 19 and a coil spring 38 surrounds rod 36 with the ends of the spring contacting collar 39 and indicator 35.

Referring to Fig. 3, a slider 40 mounted in the top of slide 19 transversely of rod 36, has a stop 41 on the right hand end thereof. Said stop is adapted to operate in and out of notch 42. Slider 40 has a cutout 43, which is located just above rod 36. An operating button 44 on the opposite end of slider 40 provides means for operating the same. A coil spring 45 surrounding slider 40 is interposed between button 44 and the exterior of slide 19. When in operative position point 46 of cutout 43 bears against rod 36 with sufficient pressure to hold it in fixed position. Referring to Fig. 4, a finger hold 47 is located to the right of slider 40 so that the thumb of the operator's hand is adapted to press upon button 44 while the forefinger 49 presses against the finger hold 47.

Cylinder 9 has connected thereto at the left hand thereof, a tube 51 which is connected to an aligned tube 52 by a ball and socket joint 53 held in position by clamp 54. The upper end of the tube 52 is connected to a 2-way stopcock having an upwardly-extending pipe 56, connected to a reservoir or container 57. An inverted U-shaped capillary tube 58 connected to stopcock 55 has a reduced delivery end 59. Said end may be ground bevel so as to prevent a drop of liquid from adhering thereto during the operation, or, as titration is usually done below the level of the liquid, this feature may be omitted.

Indicator 35 has the ordinary pointer 60 which is adapted to measure single units of volume. It is also usually provided with a small dial carrying a pointer 61 which registers complete revolution of pointer 60. In some dial indicators, pointer 61 is concentric with pointer 60 but is of lesser length.

In the operation of the instrument, the thumb and forefinger are in the positions shown in Fig. 4, button 44 is pressed and slider 40 rotated about one-quarter of a turn and released whereby stop 41 abuts against the extension of slide 19 and rod 36 is released. Then the liquid in container 57 is allowed to flow into cylinder 9 by setting the stopcock to the proper position and retracting piston 15 by suitable rotation of disk 25. Indicator 35 is at the zero position. Disk 25 is rotated to advance screw 23, slide 19 and plunger 15, while stopcock 55 is adjusted to allow liquid to flow through capillary tube 58. The movement is stopped when a drop of liquid falls from tip 59 and the tip is wiped. Button 44 is now rotated to its original position so that stop 41 falls into recess 42 and slider 40 pressed on rod 36 causing the dial indicator to register when plunger 15 is moved forward. Analysis is made as usual causing reagent to be delivered from tip 59 underneath the level of the liquid being titrated by rotation of disk 25, and knob 30 at the end of the operation. When the titration is completed readings are taken of pointers 60 and 61 which are calibrated to read directly in volumes delivered. Then the thumb and forefinger are again pressed to release rod 36 which under the action of spring 30 brings pointers 60 and 61 to the zero positions, the stop point being set inside the dial indicator. Knob 44 is released causing slider 40 to again grip rod 36 and the apparatus is again ready for the next analysis. Many analyses may be conducted with a single filling of cylinder 9.

In a typical example the dial is set so that one revolution of pointer 60 (100 divisions) will measure 1 mm. movement. The plunger is precision machined to such diameter that 1 mm. movement will deliver 0.1 ml. and of such length that somewhat more than 10 cm. movement is possible. Thus 100 titrations may be performed before it is necessary to refill the instrument when titrations of the order of 0.1 ml. are being performed. Pointer 61 moves 1 division as pointer 60 moves 100 divisions. Thus when pointer 60 has made ten complete revolutions, pointer 61 has made one revolution delivering 10 ml. Thus titration with accuracy of better than 1% is easily performed on volumes ranging from 0.1 ml. to 10 ml. This then, in one movement replaces the ultra micro buret (less than 0.2 ml.), the micro buret (less than 2 ml.) and a macro buret (more than 2 ml.) since titrations of volumes up to 10 ml. may be performed in this instrument.

By suitable choice of dimensions the instrument can be made to deliver volumes as low as 0.001 ml. with an accuracy of 1% or better up to volumes of any desired size. Disk 25 may be operated by electric drive by a motor which is controlled by a suitable relay actuated in at least two ways depending upon the use.

First, as an electric automatic titrator, a pair of electrodes inserted into the solution to be titrated are attached to a voltmeter so that when the desired voltage (or pH) is reached, a relay is tripped which stops the titration, and the titration is read on the dial. Pressing of button 44 resets the instrument for the second run.

Second, as an instrument for delivering small measured volumes accurately, such as in filling ampules, the dial indicator needle is set so that as it reaches a predetermined point it meets a contact point which stops the motor and activates a magnet which pulls slider rod 40 producing the same effect as pushing button 44. The indicator needle is pulled back to the zero position at which point it makes contact to repeat the cycle. As slide 19 finishes the end of the run it meets a contact point which reverses the motor and stopcock at 55 and releases the slide rod 40 as before to refill the instrument. Slide 19 retreats until it touches the contact point at block 7 which starts the forward cycle again.

Although the invention has been described setting forth a single specific example thereof, the invention is not to be limited to the details set forth, for instance various changes in the details of construction and of manipulation may be made without departing from the principle herein set forth. The container or cylinder 9 need not be made of glass but any other suitable material may be used, although it is advantageous to have the container transparent. Instead of having a bulb as a reservoir 57, other devices may be used, as for example a jar or bottle with a suitable connection to stopcock 55.

The instrument itself may be made in different proportions and the elements thereof may be arranged differently. For instance, tie-rods 4 and 5 may be replaced by other means and the shape and location of various elements may be changed. Instead of the device shown in Figs. 3 and 4 for bringing the indicator to the zero position, other equivalent means may be used. Also, the operation of the plunger or piston 15 may be obtained by other means than the disk 25 and knob 30, which is well known.

The dial indicator is used to translate linear motion so that the linear motion may be read on the dial. This particular device consists of a ratchet and gear arrangement. This same purpose may be accomplished by a friction contact between the moving rod and the vertical swivel attached to the indicator needle, instead of the ratchet. Thus, dial gauges used in an aneroid barometer which also translate linear motion to circular motion may also be used. Electronic devices which change the capacity of a condenser or which changes inductance of a coil as a rod is moved closer to a plate or moved in and out of a coil may also be used for the same purpose.

These and other changes in the details may be made without departing from the spirit of the invention which is to be broadly construed and not to be limited except to the character of the claims appended hereto.

I claim:

1. Apparatus for accurately delivering a wide range of volumes of liquid comprising a base carrying a closed container, a tube connected to said container for delivering liquid from said container, a plunger adapted to slide in said container to force liquid into said tube, an indicator having an operating rod, said plunger being mounted on a slidable block, means for shifting said slidable block, said operating rod being adapted to be clamped to said slidable block by a latch, so that movement of said plunger will result in registering said movement on the dial indicator, means for biasing said rod away from said indicator, and means for releasing said rod to re-set said indicator.

2. Apparatus for accurately delivering a wide range of volumes of liquid comprising a base carrying a closed container, a tube connected to said container for delivering liquid from said container, a plunger adapted to slide in said container to force liquid into said tube, an indicator having an operating rod, said plunger being mounted on a slidable block, means for shifting said slidable block, said operating rod being adapted to be clamped to said slidable block by a latch so that movement of said plunger will result in registering said movement on the dial indicator, means for biasing said rod away from said indicator, and means for releasing said rod to reset said indicator, including a latch mounted in said block and engaging said rod, a spring element for maintaining contact between said latch and rod and means for operating said element to release said rod.

3. Apparatus for accurately delivering a wide range of volumes of liquid comprising a base carrying a closed container, a tube connected to said container for delivering liquid from said container, a plunger adapted to slide in said container to force liquid into said tube, an indicator having an operating rod, said plunger being mounted on a slidable block, means for shifting said slidable block, said operating rod being adapted to be clamped to said slidable block by a latch so that movement of said plunger will result in registering said movement on the dial indicator, means for biasing said rod away from said indicator, and means for releasing said rod to re-set said indicator, including a latch mounted in said block and engaging said rod, a spring element for maintaining contact between said latch and rod and means for operating said element to release said rod, including a latch mounted in said block and engaging said rod, a spring element for maintaining contact between said latch and rod and means for operating said element to release said rod and a lock for holding said latch in release position.

4. Apparatus according to claim 1 in which said indicator has a calibrated circular dial, at least one pointer and connections to said rod for operating said pointer.

5. Apparatus according to claim 1 in which the end of said chamber into which said plunger enters has a gasket engaging said plunger.

6. Apparatus according to claim 1 in which said shifting means includes a stationary member, a screw operating therein, the end of said screw contacting said block.

7. Apparatus according to claim 1 in which said shifting means includes a stationary member, a screw operating therein, the end of said screw contacting said block and at least one tie rod between said base and member and passing through said block.

8. Apparatus according to claim 1 in which said rod has a projection and a spring interposed between said indicator and rod for biasing the latter.

9. Apparatus according to claim 1 in which the end of said chamber opposite said plunger contacts a pressure plate on said base for anchoring said chamber.

10. Apparatus for accurately delivering a wide range of volumes of liquid comprising a base carrying a closed container, a tube connected to said container for delivering liquid from said container, a plunger adapted to slide in said container to force liquid into said tube, an indicator having an operating rod, said plunger being mounted on and fixed to a slidable block, means for shifting said slidable block and plunger, said operating rod being adapted to be clamped to said slidable block by a latch on said block, so that movement of said plunger will result in registering said movement on the dial indicator, means for biasing said rod away from said indicator, and means for releasing said rod to re-set said indicator and a reservoir for said liquid attached to said tube.

References Cited in the file of this patent
UNITED STATES PATENTS

| | | |
|---|---|---|
| 974,915 | Puderbaugh | Nov. 8, 1910 |
| 1,196,981 | Rieb | Sept. 5, 1916 |
| 1,265,537 | Shull | May 7, 1918 |
| 1,390,508 | Crowder | Sept. 13, 1921 |
| 1,634,156 | McCommon | June 28, 1927 |
| 1,750,979 | Webb | Mar. 18, 1930 |
| 2,158,774 | Grubelic | May 16, 1939 |